(No Model.)

H. W. FISHER.
ELECTRIC CABLE.

No. 508,295. Patented Nov. 7, 1893.

WITNESSES:
Darwin S. Wolcott
C. E. Hunt

INVENTOR,
Henry W. Fisher
by George H. Christy
Att'y.

UNITED STATES PATENT OFFICE.

HENRY W. FISHER, OF PITTSBURG, PENNSYLVANIA, ASSIGNOR TO THE STANDARD UNDERGROUND CABLE COMPANY, OF SAME PLACE.

ELECTRIC CABLE.

SPECIFICATION forming part of Letters Patent No. 508,295, dated November 7, 1893.

Application filed August 7, 1893. Serial No. 482,569. (No model.)

*To all whom it may concern:*

Be it known that I, HENRY W. FISHER, a citizen of the United States, residing at Pittsburg, in the county of Allegheny and State of Pennsylvania, have invented or discovered certain new and useful Improvements in Electric Cables, of which improvements the following is a specification.

Great difficulty is experienced in locating breaks or faults in electric cables formed of a number of insulated wires, when the injury of the cable is of such character as to destroy or reduce the insulation resistance of all the wires in the cable. Cables wherein the wires are insulated from each other by wrappings of paper or other good absorbents of moisture, are especially liable to be so injured, for the reason that, in case of a slight puncture through the outside protecting covering, moisture will pass through and saturate all the coverings of the individual wires, thereby rendering them all useless for electrical purposes. In such case, it is necessary to find some aerial line connecting the points between which the fault lies, to be employed in connection with the galvanometer for the location of the fault. Even this recourse to aerial lines is impracticable if not impossible, when conductors for the heavy currents now employed for electric street railways, are parallel with the aerial line, for any portion of its distance, on account of the currents induced from the street car cables to the aerial line.

The object of the present invention is to provide in each cable, one, two or more conductors which shall be so insulated as not to be liable to injury, so that these wires can be employed not only in the same manner as the other wires of the cable, but, also, for locating faults, for the reason that they will always be in condition for use.

The invention will be hereinafter more fully described and claimed.

Figure 1:
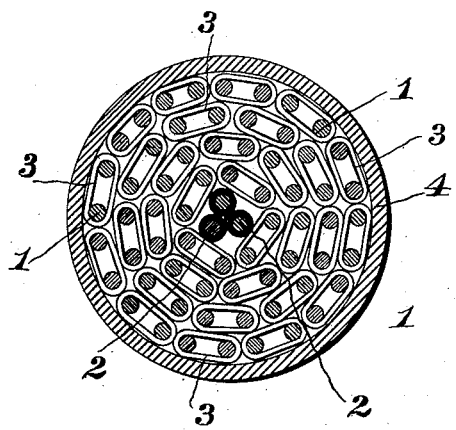
Figure 2:
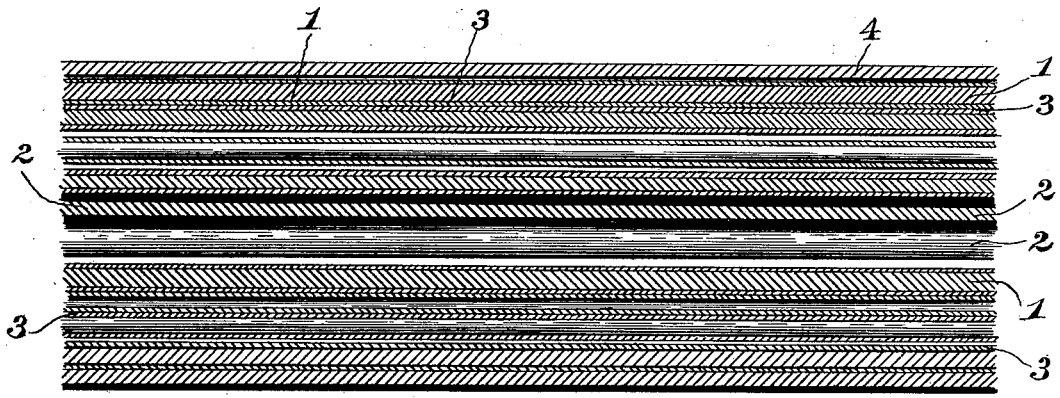

In the accompanying drawings forming a part of this specification, Figure 1 is a transverse section of a cable embodying my improvement, and Fig. 2 is a longitudinal section of the same.

In the practice of my invention, in addition to the wires 1, which are preferably insulated from each other with paper wrappings in the usual or any suitable manner, I introduce into the center of the cable one, two or more wires or conductors 2, which are insulated with rubber, or other high non-conducting material, which is not liable to injury by moisture or otherwise. While it is preferred to arrange these wires 2 in the center of the cable, as they are there least liable to injury, they may be located in any other part thereof. In case of a puncture or other injury to the outside casing 4 of the cable, so that moisture would be admitted therethrough, thereby destroying the insulation of all the wires having the paper insulation 3, these wires 2 can be used in connection with the galvanometer for the location of the fault. As the insulation of the wire 2 is of such high character, it is possible to locate an injury to the insulation of the other wires of the cable even before the damage has become such as to entirely destroy the insulation resistance of all the other wires, and render them inefficient or useless for commercial purposes. As the wires 2 are continuous throughout the entire length of the cable, they may be employed for the ordinary commercial use of the cable, in the same manner as the other wires thereof.

It will be understood that I do not limit the use of testing conductors having a high insulation as compared with the other conductors, to cables having their commercial conductors insulated with paper, but include as within the scope of my invention such cables as have one or more of their conductors protected by high insulation as against injury to which the other conductors are liable.

I claim herein as my invention—

1. In combination with the insulated wires of an electric cable, one or more conductors having a high insulation, whereby they are protected as against an injury destructive of the insulation of the other wires of the cable, substantially as set forth.

2. In a cable one or more conductors having insulation permeable by moisture in combination with one or more conductors having rubber insulation whereby the latter are protected as against injury by moisture, substantially as set forth.

3. In a cable the combination of a series of wires having paper insulation and one or more wires having a high insulation, whereby they are protected as against an injury destructive of the insulation of the other wires of the cable, substantially as set forth.

4. In a cable, the combination of a series of wires having paper insulation, and one or more wires having a rubber insulation, substantially as set forth.

In testimony whereof I have hereunto set my hand.

HENRY W. FISHER.

Witnesses:
DARWIN S. WOLCOTT,
JOHN L. RALPH.